(12) United States Patent
Danielson

(10) Patent No.: US 8,844,979 B2
(45) Date of Patent: Sep. 30, 2014

(54) QUICK CONNECT FLUID CONNECTORS WITH ROLLER MECHANISM ACTUATOR

(75) Inventor: Robert Danielson, Ham Lake, MN (US)

(73) Assignee: FasTest, Inc., Roseville, MN (US)

( * ) Notice: Subject to any disclaimer, the term of this patent is extended or adjusted under 35 U.S.C. 154(b) by 474 days.

(21) Appl. No.: 13/347,310

(22) Filed: Jan. 10, 2012

(65) Prior Publication Data
US 2013/0174928 A1    Jul. 11, 2013

(51) Int. Cl.
*F16L 37/00*    (2006.01)

(52) U.S. Cl.
USPC ............. 285/322; 285/83; 285/277; 137/798; 251/229; 251/231; 251/252

(58) Field of Classification Search
USPC ............ 137/798; 285/322, 324, 276, 277, 91; 251/229, 235, 251, 252
See application file for complete search history.

(56) References Cited

U.S. PATENT DOCUMENTS

| | | |
|---|---|---|
| 2,675,829 A | 4/1954 | Livers |
| 5,316,033 A | 5/1994 | Schumacher et al. |
| 5,507,537 A | 4/1996 | Meisinger et al. |
| 5,575,510 A | 11/1996 | Weh et al. |
| 5,649,723 A * | 7/1997 | Larsson ........................... 285/34 |
| 5,927,683 A | 7/1999 | Weh et al. |
| 6,375,152 B1 | 4/2002 | Weh et al. |
| 6,786,516 B2 * | 9/2004 | Cronley ......................... 285/322 |
| 7,140,645 B2 * | 11/2006 | Cronley ........................... 285/34 |
| 2005/0212289 A1 | 9/2005 | Weh et al. |

OTHER PUBLICATIONS

International Search Report PCT/US2013/020810 (Form PCT/ISA/210), Apr. 23, 2013, 3 pages.

* cited by examiner

*Primary Examiner* — Craig Schneider
(74) *Attorney, Agent, or Firm* — Hamre, Schumann, Mueller & Larson, P.C.

(57) ABSTRACT

Quick connect fluid connectors are described that can be used to connect a first fluid system to a second fluid system for transferring fluids between the first and second fluid systems. The connectors include an eccentric mounted roller mechanism disposed within a slot in a main body and that is in continuous engagement with front and back walls of the slot. The eccentric mounted roller mechanism is used to actuate connection collets when the eccentric mounted roller mechanism is rotated. Since the eccentric mounted roller mechanism is in substantially continuous contact with the front and back walls, this ensures a smooth actuation of the main body and the connection collets without any lost motion.

12 Claims, 16 Drawing Sheets

QUICK CONNECT FLUID CONNECTORS WITH ROLLER MECHANISM ACTUATOR

FIELD

Quick connect fluid connectors are described for transferring fluids, including gaseous or liquid fluids, between first and second fluid systems, for example for filling gas cylinders.

BACKGROUND

Quick connect fluid connectors are known for connecting fluid systems to one another to transfer fluids from one system to another. In one exemplary application, in industrial fill plants, quick connect fluid connectors are used at fill stations to connect to gas cylinders to process the cylinders. The cylinders can vary from, for example, the relatively smaller, portable oxygen cylinders for personal medical use to large gas cylinders used for welding. Some quick connect fluid connectors require threading and un-threading of the connector which can create fatigue on the operator. In addition, the quicker the connection/disconnection of the connector, the less time that is required to process a cylinder. In addition, in view of the high pressures involved, disconnection of the connector while under pressure needs to be avoided.

SUMMARY

Quick connect fluid connectors are described that can be used to connect a first fluid system to a second fluid system for transferring fluids between the first and second fluid systems. As used herein, the term fluid can include gases, liquids or mixtures of both. In one exemplary application, the described quick connect fluid connectors can be used at a fill station in an industrial fill plant for filling gas cylinders. However, the described quick connect fluid connectors can be used for any application to connect a first fluid system to a second fluid system to transfer a fluid between the two systems.

The described quick connect fluid connectors eliminate threading and un-threading of the connection, thereby reducing fatigue on the operator. The connectors connect quickly and process more fluid, reducing the amount of time required to process a cylinder. In addition, the connectors are designed to prevent accidental disconnection while under pressure.

One feature of the described quick connect fluid connectors is an eccentric mounted roller mechanism disposed within a slot in a main body and that is in continuous engagement with front and back walls of the slot. The eccentric mounted roller mechanism is used to actuate connection collets when the eccentric mounted roller mechanism is rotated. Since the eccentric mounted roller mechanism is in substantially continuous contact with the front and back walls, this ensures a smooth actuation of the main body and the connection collets without any lost motion.

Another feature is an inner sleeve that is independent of the outer sleeve to allow the inner sleeve to float. This permits the pistons of the connectors to be biased by a spring to seal against the gas cylinder for improved sealing.

In addition, in one embodiment, a mechanism is provided to limit the range of travel of the piston in a reverse direction, to permit the piston to move enough to allow loss of sealing ability with the gas cylinder but not enough movement to allow disconnection of the connector.

The eccentric mounted roller mechanism feature, the floating inner sleeve and the mechanism to limit travel of the piston can be used together in a connector, used separately from each other in a connector, or can be used in any combination in a connector.

In one embodiment, a quick-connect connector for transferring a fluid includes a cylindrical sleeve defining a longitudinal axis. A main body is disposed at least partially in the sleeve, and the main body and the sleeve are slideable relative to one another parallel to the longitudinal axis. The main body includes a first main body end region, a second main body end region, and a fluid port connected thereto that projects beyond an exterior of the cylindrical sleeve. In addition, the main body defines a fluid passageway that is in fluid communication with the fluid port, and the main body includes an actuation slot defined therein. A piston is disposed at least partially within the main body, and the piston and the main body are slideable relative to one another parallel to the longitudinal axis. The piston includes a first piston end region that projects axially beyond the first main body end region of the main body, a second piston end region disposed within the main body, and a fluid passageway that extends from the first piston end region and is in fluid communication with the fluid passageway of the main body. A connection mechanism is mounted to the first main body end region for connection to a fluid processing port, with the connection mechanism including a plurality of collets that surround the first piston end region and that are actuatable between a connect position for connection with the fluid processing port and a disconnect position. An actuation mechanism is provided for actuating the collets from the disconnect position to the connect position. The actuation mechanism includes a pair of cylinders rotatably supported by the sleeve for rotation about a first axis, and an eccentric mounted roller mechanism interconnecting the cylinders that is disposed within the actuation slot of the main body and extends along a second axis that is offset from the first axis.

In another embodiment, a quick-connect connector that is connectable to a processing port of a gas cylinder includes a cylindrical sleeve defining a longitudinal axis, and a main body disposed at least partially in the sleeve, with the main body and the sleeve being slideable relative to one another parallel to the longitudinal axis. The main body includes a fluid port connected thereto that projects beyond an exterior of the cylindrical sleeve, the main body defines a fluid passageway that is in fluid communication with the fluid port, and the main body includes an actuation slot defined therein that includes first and second facing side walls. A piston is disposed at least partially within the main body, and the piston and the main body are slideable relative to one another parallel to the longitudinal axis. The piston includes a fluid passageway that is in fluid communication with the fluid passageway of the main body, and the fluid passageway of the piston includes an end configured for fluid communication with the processing port of the gas cylinder. A connection mechanism is mounted to the main body and is connectable to the processing port of the gas cylinder. The connection mechanism includes a plurality of collets that are actuatable between a connect position for connection with the processing port and a disconnect position. An actuation mechanism is connected to the collets to actuate the collets between the disconnect position and the connect position. The actuation mechanism includes an eccentric roller mechanism and a handle connected to the eccentric mounted roller mechanism for rotating the eccentric mounted roller mechanism about a rotation axis that is offset from a rotation axis of the handle. The eccentric mounted roller mechanism is disposed within the actuation slot of the main body and is in continuous engagement with the first and second facing side walls.

DETAILED DESCRIPTION

Figure 1:
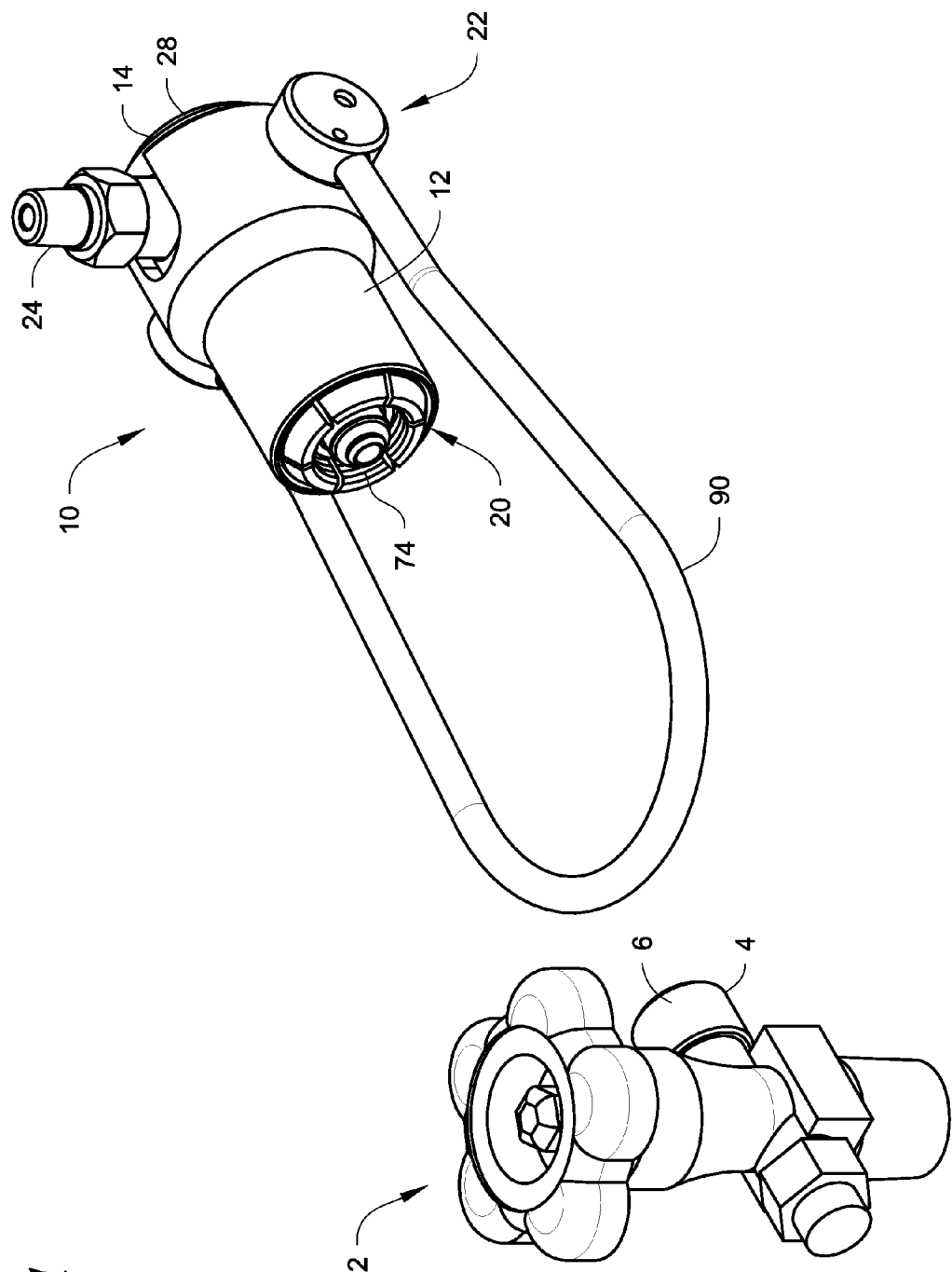
FIG. 1 is a perspective view of one embodiment of a quick connect fluid connector for connection to a valve of a gas cylinder.

With reference initially to FIGS. 1-5, a first embodiment of a quick connect fluid connector 10 for connection to a valve 2 of a gas cylinder will be described. The construction of the valve 2 and gas cylinder are conventional. The valve 2 controls the ingress and egress of fluid, in this case gas, to and from the cylinder. The valve 2 includes a processing port 4 designed to engage with a connection mechanism of the connector 10 and through which gas is introduced into or discharged from the gas cylinder. An exterior surface 6 of the processing port 4 is provided with threads or other conventional structure for engagement by the connection mechanism of the connector 10.

With reference to FIGS. 1-2 and 4-5, the connector 10 includes a cylindrical outer sleeve 12 that defines a longitudinal axis, a main body 14, a piston 16, an inner sleeve 18, a connection mechanism 20, and an actuation mechanism 22.

The main body 14 is disposed at least partially in and surrounded by the sleeve 12. In the illustrated embodiment, the main body 14 is almost entirely disposed within the sleeve except for a small portion of a rear end of the main body and a nipple 24 fixed to the main body that defines a fluid port and that projects beyond an exterior of the cylindrical sleeve 12 with the nipple disposed generally at a 90 degree angle relative to the longitudinal axis. The nipple 24 may also be disposed so that the flow path defined thereby is straight through the connector parallel to the longitudinal axis or disposed at angles other than 90 degrees.

The main body and the sleeve are slideable relative to one another parallel to the longitudinal axis. The main body 14 includes a first or front main body end region 26, a second or rear main body end region 28. In addition, the main body defines a fluid passageway 30 that is in fluid communication with the fluid passageway of the nipple 24 so that fluid can flow between the nipple and the fluid passageway 30.

Figure 4:
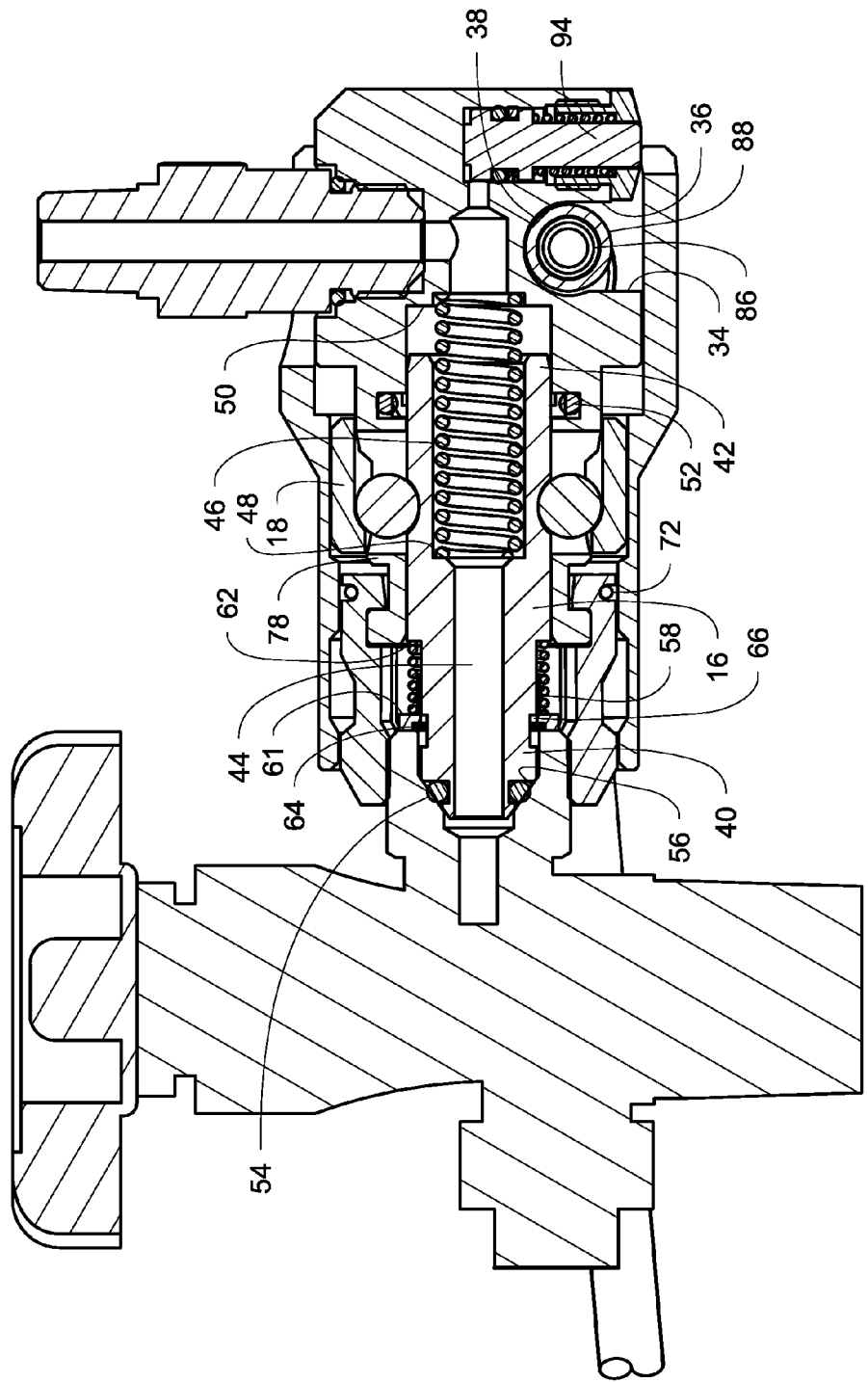
FIG. 4 is a cross-sectional view of the connector connected to the valve.

Further, an actuation slot 32 is defined in the main body adjacent to the second main body end region 28 which receives a part of the actuation mechanism 22 as described further below. In the illustrated embodiment, the actuation slot 32 is downward facing with the bottom of the slot closed off by the sleeve 12. However, other orientations of the actuation slot are possible. As best seen in FIG. 4, the slot 32 is defined by a first or front side wall 34, a second or rear side wall 36 that faces the first wall 34, and a curved upper wall 38 that interconnects the side walls 34, 36.

Figure 2:
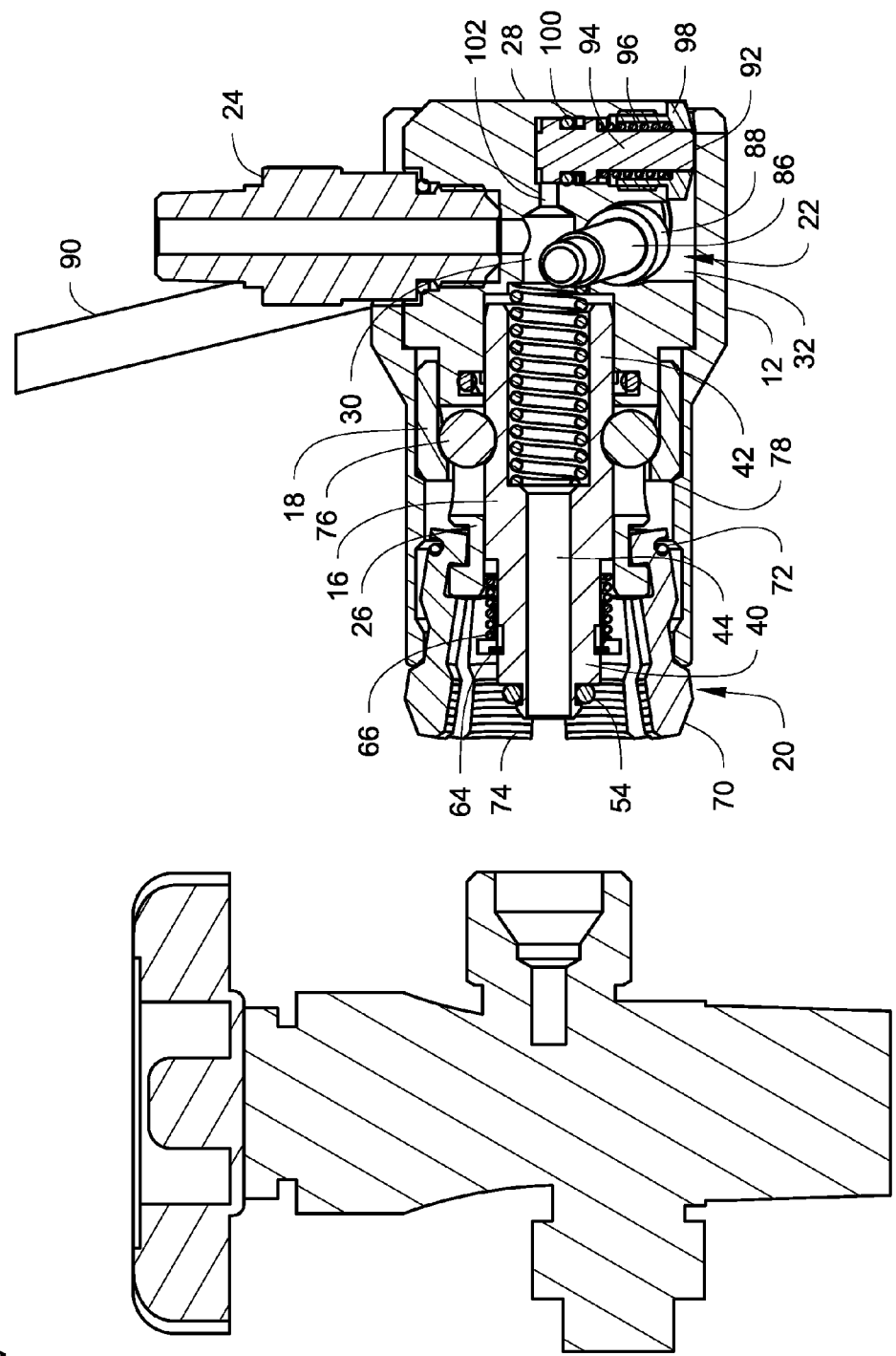
FIG. 2 is a cross-sectional view of the connector of FIG. 1 in an open configuration ready to connect to the valve of the gas cylinder.
Figure 5:
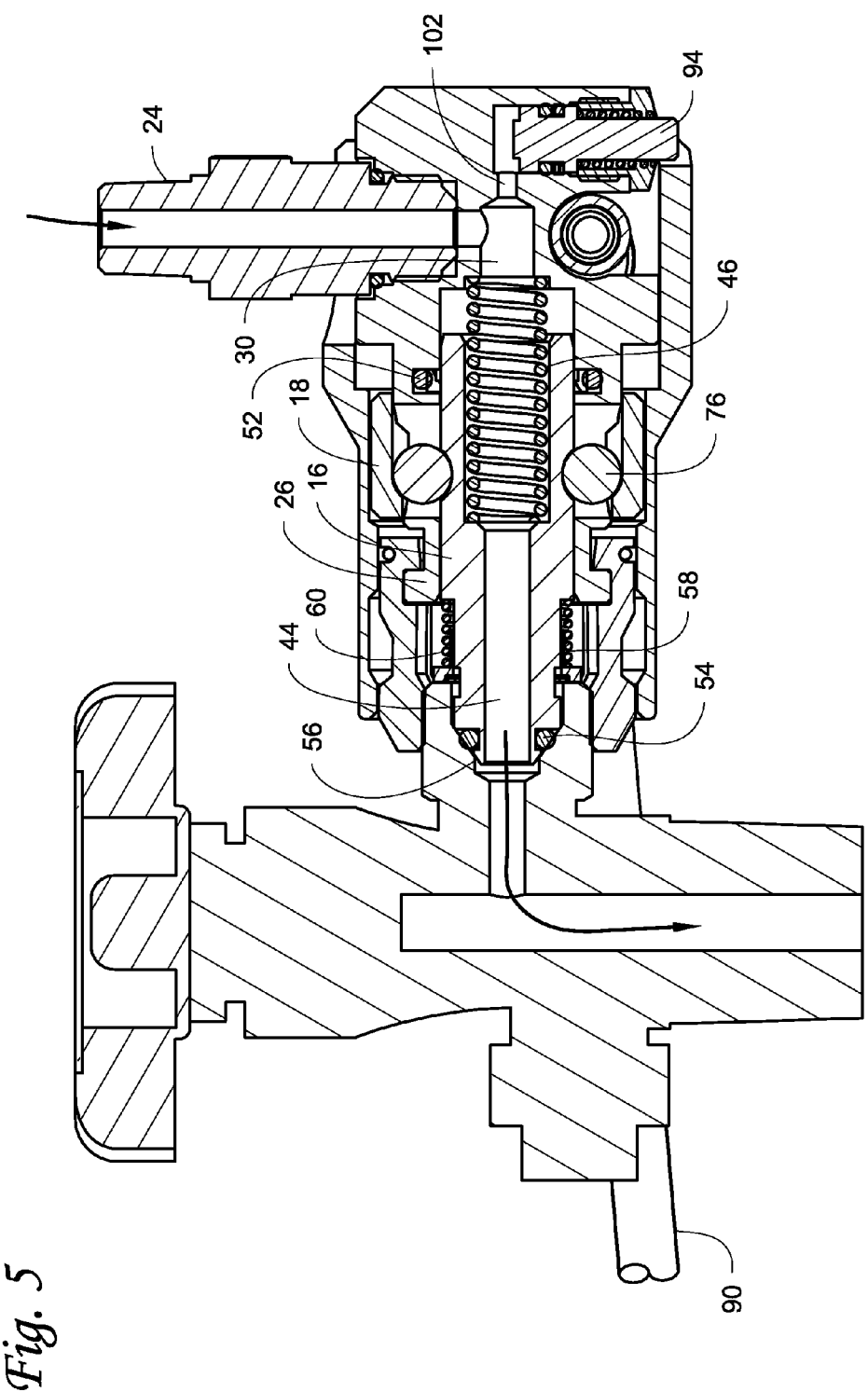
FIG. 5 is a cross-sectional view of the connector while the connector is pressurized.
Figure 6:
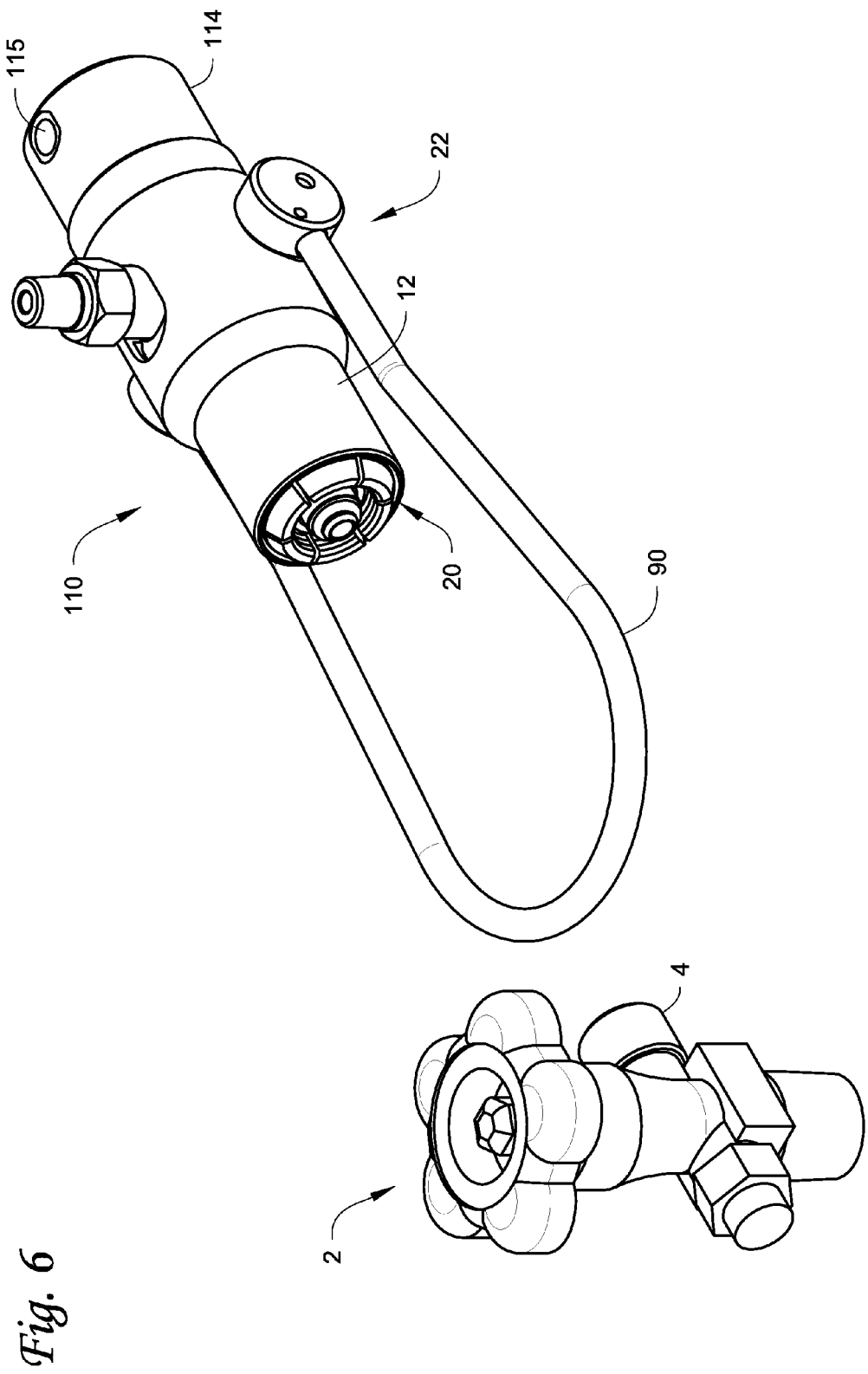
FIG. 6 is a perspective view of a second embodiment of a quick connect fluid connector for connection to a valve of a gas cylinder.

With reference to FIGS. 2, 4 and 5, the piston 16 is a cylindrical member that is disposed at least partially within the main body 14, and the piston is slideable relative to the main body parallel to the longitudinal axis. The piston 16 includes a first piston end region 40 that projects axially beyond the first main body end region 26, a second piston end region 42 disposed within the main body, and a fluid passageway 44 that extends from the first piston end region 40 and is in fluid communication with the fluid passageway 30 of the main body.

The interior of the piston end region 42 is hollowed out to have a larger diameter than the fluid passageway 44 and the hollowed out end region 42 receives a spring 46, for example a coil spring, that abuts at one end against a shoulder 48 defined within the piston and abuts at its opposite end against a shoulder 50 defined in the main body 14. The spring 46 biases the piston 16 in a direction toward the left in FIGS. 2 and 4, i.e. toward the valve 2 or in a direction away from the end region 28 of the main body. A seal 52, for example a slip seal and an o-ring seal, is provided between the outer surface of the piston and the inner surface of the main body to prevent fluid leakage between the piston and the main body.

The end region 40 of the piston 16 includes a seal 54, for example an elastomeric o-ring seal, disposed thereon intended for sealing with an interior surface 56 within the processing port 4 as shown in FIG. 4.

Surrounding the piston 16 adjacent to the end region 40 is an alignment collar or sleeve 58 that helps to guide the connector 10 onto the processing port 4 and to give the connector stability against the processing port. A spring 60, for example a coil spring, surrounds the alignment collar 58 and abuts at one end against a shoulder 61 defined by an enlarged front end of the collar 58 and abuts at its opposite end against a shoulder 62 defined on the piston 16. A retaining ring 64 secured within a groove 66 formed in the exterior of the piston 16 retains the collar 58 on the piston.

The connection mechanism 20 is mounted to the first main body end region 26 and is designed for connection to the processing port 4. The connection mechanism 20 can be any type of connection mechanism conventionally used on quick connect fluid connectors for connection with the processing port. In the illustrated example, the connection mechanism 20 includes a plurality of collets 70 that are mounted on the main body 14 and surround the first piston end region 40. A spring 72, for example a garter spring, surrounds one end of the collets 70 and biases the collets toward an open or disconnect position shown in FIG. 2. The collets 70 are actuatable to a closed or connect position for connection with the processing port 4 by the outer sleeve 12 as shown in FIG. 4. The interior surfaces of the collets 70 are formed with threads 74 that grip with corresponding threads formed on the outer surface 6 of the port 4. This construction and operation of the collets and actuation of the collets by the outer sleeve 12 is conventional and would be well understood by persons of ordinary skill in the art.

The inner sleeve 18 is cylindrical, surrounds the main body 14, and is disposed within and surrounded by the cylindrical sleeve 12. The inner sleeve 18 is mounted so as to be moveable independently of the cylindrical sleeve and the main body 14. A plurality of balls 76 are disposed between the interior surface of the inner sleeve 18 and the outer surface of the piston 16 which defines a circumferential recess that receives the balls 76. In the open configuration of the connector shown in FIG. 2, the sleeve 12 includes an inner shoulder 78 that abuts with the inner sleeve 18. To reach the open configuration, the shoulder 78 of the sleeve 12 engages the inner sleeve 18 which pulls the inner sleeve back. As the inner sleeve is pulled back, it engages the balls 76 which are engaged with the piston 16, thereby pulling the piston back.

The actuation mechanism 22 is configured to actuate the collets 70 from the open or disconnect position in FIG. 2 to the closed or connect position shown in FIG. 4. As discussed above, the actuation mechanism 22 interacts with the slot 32 in the main body 14 for actuating the main body relative to the outer sleeve 12 to retract the main body relative to the sleeve 12. As this occurs, the collets 70 are forced by the sleeve 12 to their closed or connect position.

Figure 3:
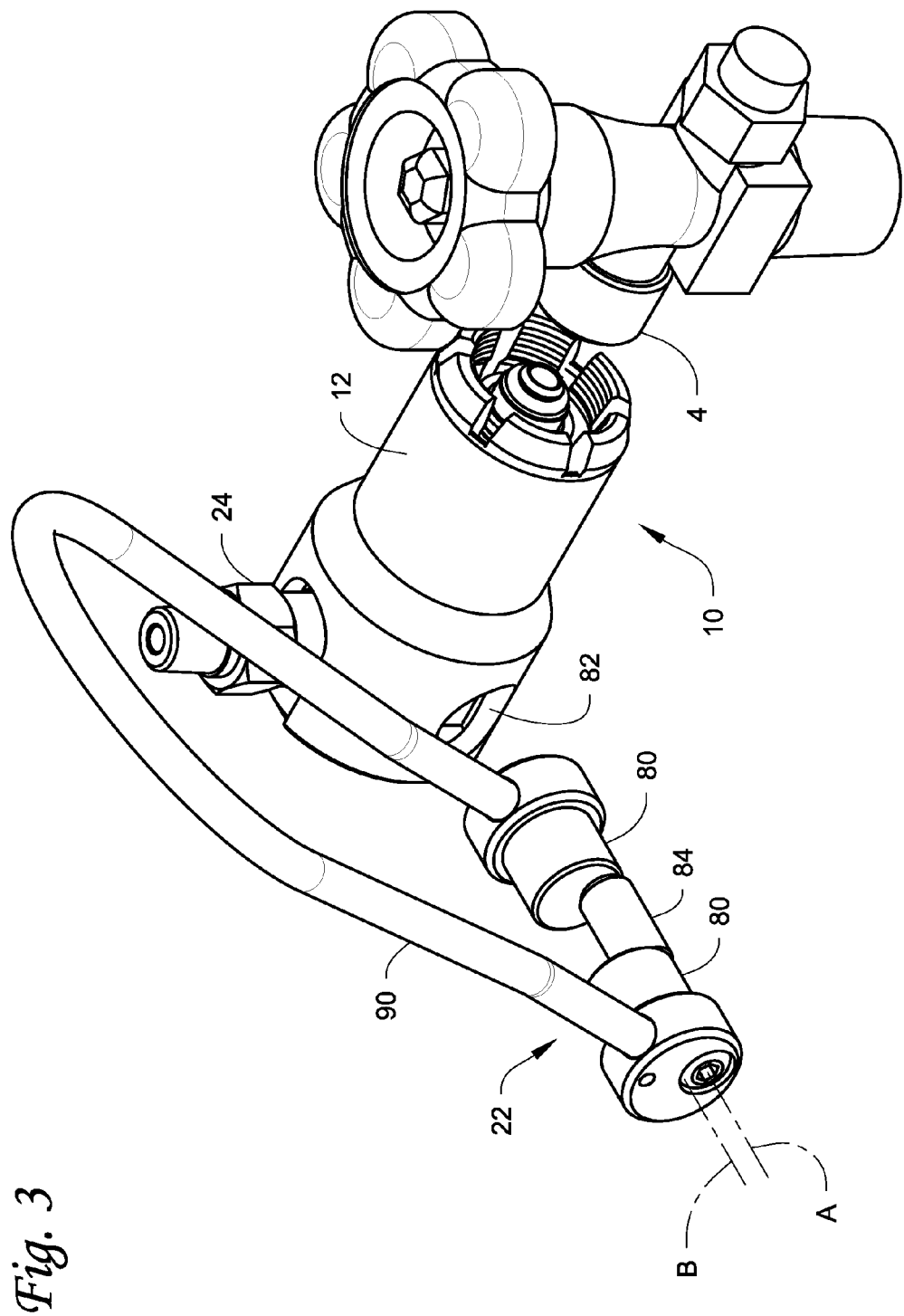
FIG. 3 is an exploded view of portions of the connector showing details of the eccentric roller mechanism.

With reference to FIG. 3, the actuation mechanism 22 includes a pair of cylinders 80 that are rotatably disposed within correspondingly shaped holes 82 formed through opposite sides of the sleeve 12. Only one hole 82 is visible in FIG. 3. The cylinders 80 are rotatably supported by the sleeve for rotation about a first axis. An eccentric mounted roller mechanism 84 interconnects the cylinders 80. As shown in FIGS. 2, 4 and 5, the eccentric mounted roller mechanism 84 includes a shaft 86 that interconnects the cylinders 80, and a sleeve 88 rotatably disposed about the shaft 86 so that the sleeve 88 can rotate relative to the shaft 86 and relative to the cylinders 80.

As shown in FIGS. 2, 4 and 5, the eccentric roller mechanism 84 is disposed within the actuation slot 32 of the main body 14. With reference additionally to FIG. 3, the eccentric mounted roller mechanism extends along an axis A that is offset from the axis of rotation B of the cylinders 80. Therefore, when the cylinders 80 rotate about the axis B, the shaft 86 and the sleeve 88 of the eccentric mounted roller mechanism 84 move in an arc with both an up/down vertical component in the slot 32 as well as side-to-side axial movement component. The slot 32 accommodates the up/down vertical movement. The side-to-side axial movement component causes axial movement of the main body 14.

A handle 90, for example a bail handle, is connected at each end thereof to the cylinders 80 for rotating the cylinders about the axis B.

With reference to FIGS. 2, 4 and 5, a lock mechanism 92 is provided for locking relative movement of the main body 14 and the sleeve 12 when the connector is under pressure. The lock mechanism 92 includes a fluid actuated lock piston 94 that is moveable between a retracted position shown in FIG. 2 and a lock position shown in FIG. 5. A spring 96, for example a coil spring, is engaged with the lock piston and biases the piston 94 toward the retracted position. One end of the spring 96 is engaged with a flange formed on the piston 94 and the other end of the spring is engaged against a stop 98 that is secured in the main body 14. A seal 100, for example an o-ring seal, is disposed around the piston 94 to prevent fluid leakage.

A fluid port 102 extends between the fluid passageway 30 and the chamber containing the piston 94. When working fluid flows through the connector, some of the working fluid flows through the port 102 and acts against the end of the piston 94. The force of the fluid acting against the end of the piston forces the piston downward against the bias of the spring 96 to the lock position shown in FIG. 5.

Operation of the connector 10 will now be described with reference to FIGS. 2-5. With reference initially to FIG. 3, rotation of the handle 90 causes movement of the main body 14 forward and backwards via the eccentric roller mechanism 84. The rotation of the handle 90 causes rotation of the cylinders 80, which rotates the eccentric roller mechanism 84 about an arc within the slot 32. The slot 32 permits vertical movement of the eccentric roller mechanism 84 as it moves in an arc. The horizontal movement component of the roller mechanism 84 acts against the side walls 34, 36 of the slot causing axial movement of the main body.

The eccentric mounted roller mechanism 84 is substantially in continuous engagement with the side walls 34, 36 so that the horizontal movement component of the roller mechanism 84 results in substantially immediate forward/backward movement of the main body with no (or very little) lost motion between the handle and movement of the main body. Because of tolerance limitations, there may be a gap between the roller mechanism 84 and one of the side walls, so there may be some play.

Turning to FIG. 2, the connector 10 is open, i.e. the collets are in their open or disconnect position, ready to connect to the processing port 4 of the valve 2. The handle 90 is up which extends the main body 14 outward from the sleeve 12 allowing the collets 70 to open. Also, the sleeve 12 pulls back the inner sleeve 18 which, via the balls 76, retracts the piston 16 to the right in FIG. 2. Further, because fluid is not flowing through the connector, the lock piston 94 is retracted by the spring 96.

With reference to FIG. 4, the connector is shown connected to the fluid port 4 of the valve. To achieve this, the connector is brought toward the fluid port and inserted onto the port with the end 40 of the piston inserted into the port 4 and the collets 70 surrounding the port. The alignment collar 58 is engaged against the end of the processing port 4 to give the connector 10 stability and alignment to the port 4. The handle 90 is then rotated downward to the position shown around the valve. As the handle 90 is rotated down, the main body 14 is retracted relative to the sleeve 12 which locks the collets 70 onto the external threads on the port 4. The inner sleeve 18 is no longer held back by the sleeve 12 and can therefore float relative to the sleeve 12. This permits the spring 46 to bias the piston 16 to the left against the interior surface 56 in the port to enhance the seal. The lock piston 94 is still retracted by the spring 96, but the main body 14 has now moved back to clear the sleeve 12 to allow the piston 94 to move outward and lock the sleeve 12 once pressure is applied.

With reference to FIG. 5, the connector 10 is shown while pressurized during a fill process where fluid is introduced through the nipple 24, flows through the fluid passageways 30, 44, into the valve 2 and into the cylinder to fill the cylinder. After the connector has been connected, the user opens the valve 2 manually to allow fluid to flow into the cylinder. As evident from the figures, the sealing diameter of the piston 16 is larger than the sealing diameter against the surface 56 of the processing port 4 to give the piston a positive pressure balance (this is evident from the diameter of the seal 52 which is larger than the diameter of the seal 54). Therefore, the fluid acts against the right end of the piston 16, forcing the piston to the left to increase the seal with the surface 56. Also, a portion of the fluid flows through the passageway 102 and acts against the end of the lock piston 94, forcing the lock piston outward behind the sleeve 12 to prevent the sleeve from moving backward. This prevents accidental disconnect of the connector while under pressure. In addition, because the handle 90 is around the valve 2, if there is a structural failure of the connector the connector will not fly away from the valve 2.

Disconnection of the connector is the reverse of connection. The flow of fluid through the nipple 24 is stopped and the valve 2 is closed. Once the flow is stopped and pressure has dissipated, the lock piston 94 retracts. The handle 90 is then rotated upward to the position shown in FIG. 2, which moves the main body 14 forward relative to the sleeve 12, pulling the piston back and allowing the collets to open.

FIGS. 6-10 illustrate another embodiment of a connector 110 that is similar in many respects to the connector 10 and the same or similar elements will be referenced using the same reference numerals. In particular, in the connector 110, the cylindrical outer sleeve 12, the main body 14, the piston 16, the inner sleeve 18, the connection mechanism 20, and the actuation mechanism 22 are the same or similar to the elements in the connector 10. Therefore, only the differences between the connector 110 and the connector 10 will be described in detail.

The connector 110 is designed for use with the cylinder valve 2 where a valve is disposed within the processing port 4 that is activated to an open position by the connector 110. With reference to FIGS. 7-10, to activate the processing port valve, the connector 110 includes an activation shaft 112 that is movable between a retracted position (shown in FIGS. 7 and 8) and an activation position (shown in FIGS. 9 and 10). The activation shaft 112 extends through the collets 70, the fluid passageway 44 of the piston 16, the fluid passageway 30 of the main body 14, and through the second end region 28 of the main body.

A housing 114 is fixed to the second end region 28 and includes an inlet 115 for introducing a pressurized fluid into the housing 114. The end of the activation shaft 112 is fixed to a piston member 116 that is movable within the housing. A seal 118 on the piston member 116 seals with the interior surface of the housing 114 to prevent leakage of fluid past the piston member. A spring 120, for example a coil spring, biases the piston member 116 and the activation shaft 112 to the retracted position. The spring 120 surrounds the end of the shaft 112 and has one end that abuts against the main body 14 and one end that abuts against a shaft retainer that holds the shaft 112 against the pressure piston 116.

Figure 8:
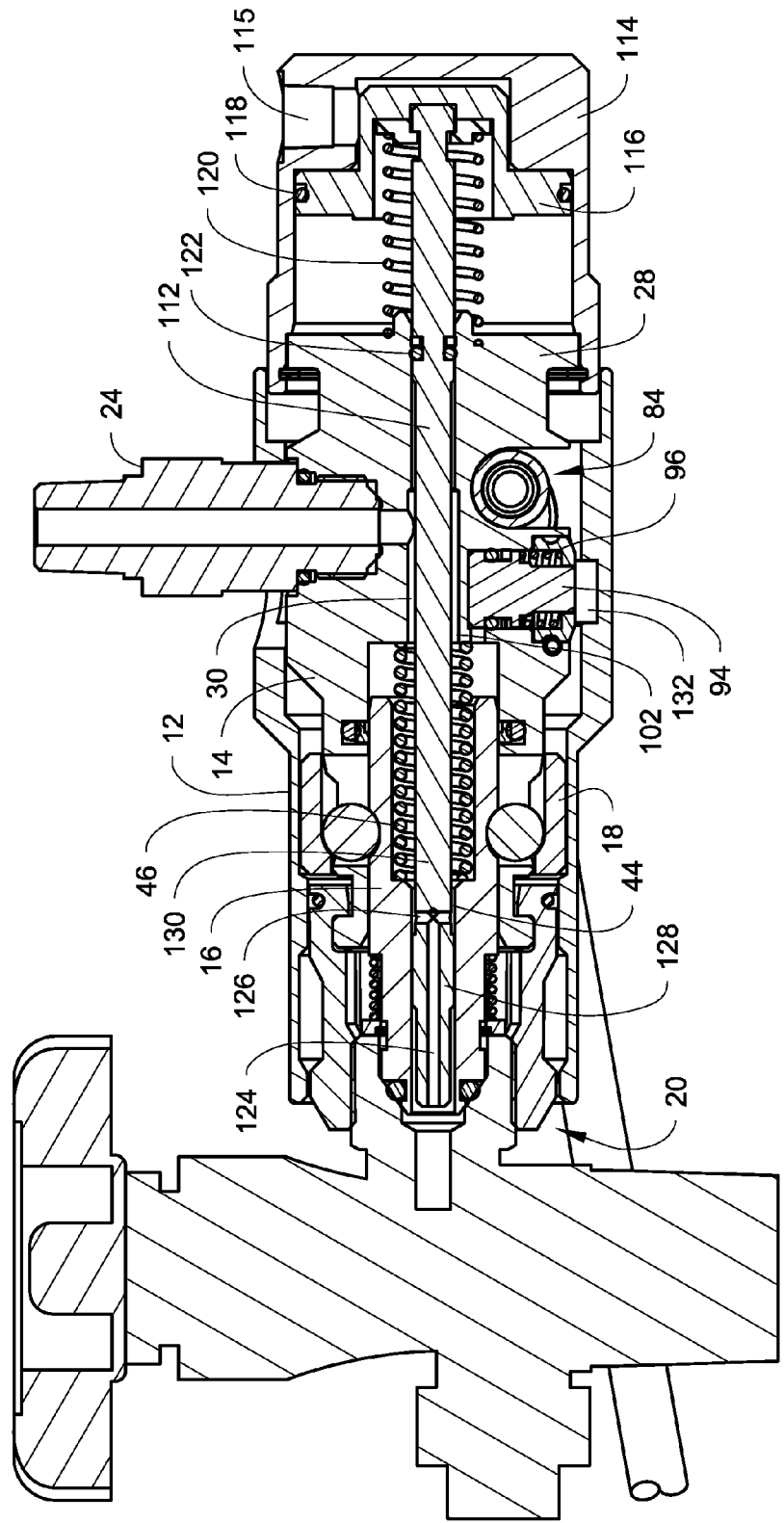
FIG. 8 is a cross-sectional view of the connector of FIG. 6 connected to the valve.

The shaft 112 is also sealed with the main body by a seal 122. The front end of the shaft 112 is formed with an internal fluid passageway 124 that extends a portion of the way through the shaft 112 to radial fluid passageways 126 that communicate the passageway 124 with the fluid passageway 44 of the piston 16. With reference to FIG. 8, the shaft 112 also includes a large diameter portion 128 that is in close proximity with the interior surface of the piston 16 to restrict fluid flow and a smaller diameter portion 130, intersected by the radial fluid passageways 126, to the rear of the large diameter portion 128 to form a fluid passage between the outer diameter of the shaft 112 and the inner diameter of the piston. In use, fluid flows into the nipple 24, through the passageway 30 of the main body 14, into the piston 16, into the fluid passage between the outer diameter of the shaft 112 and the inner diameter of the piston, through the radial passageways 126 and through the passageway 124 into the valve 2.

In the connector 110, the position of the lock mechanism 92 that locks relative movement of the main body 14 and the sleeve 12 is shifted compared to the connector 10. The lock mechanism 92 in the connector 110 is positioned forward of the eccentric roller mechanism 84. The form and function of the lock mechanism 92 is substantially similar, except that the interior surface of the sleeve 12 is provided with a channel 132 for locking engagement with the piston 94.

Operation of the connector 110 will now be described with reference to FIGS. 6-10. The construction and operation of the actuation mechanism 22 in the connector 110 is the same as the actuation mechanism in the connector 10.

Figure 7:
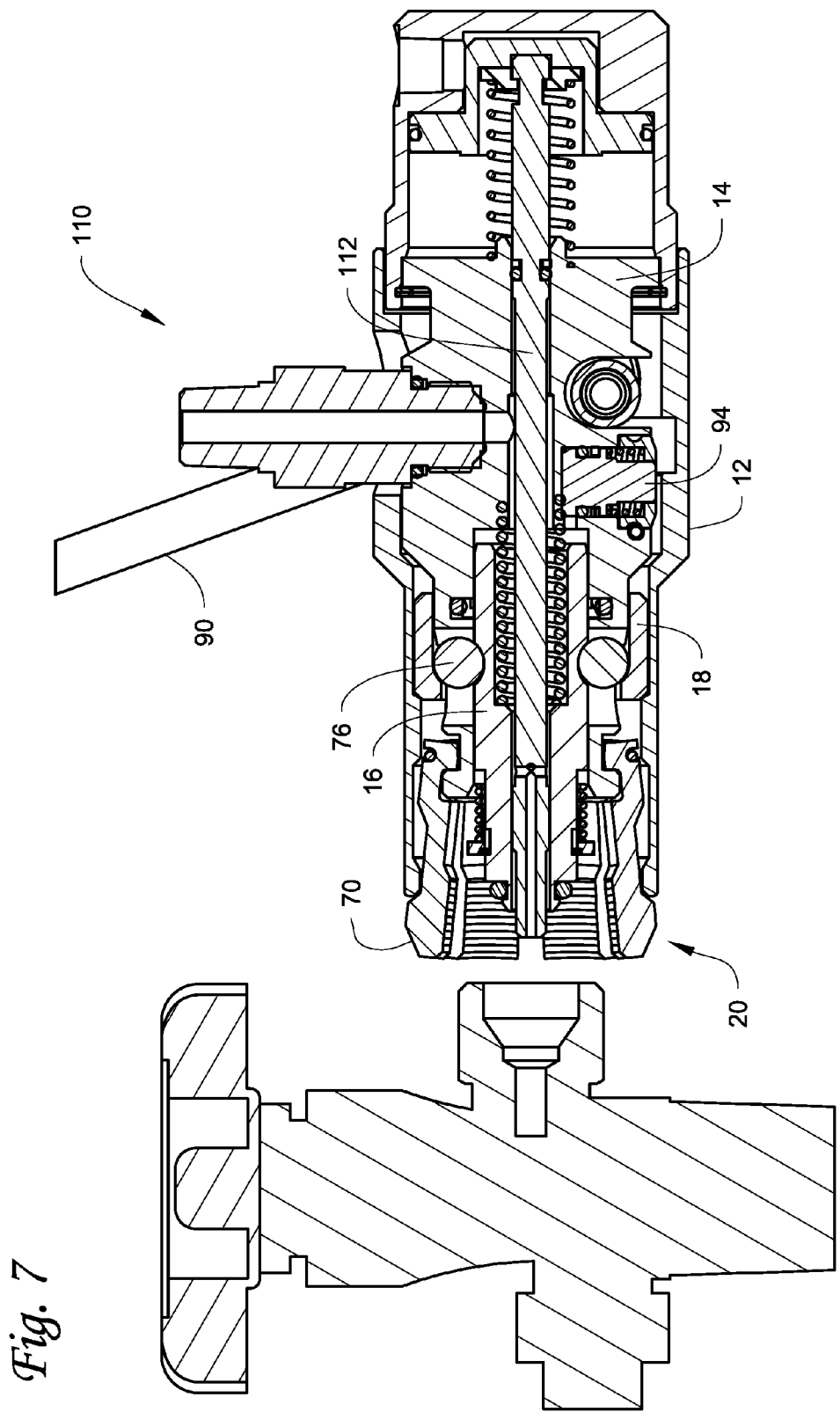
FIG. 7 is a cross-sectional view of the connector of FIG. 6 in an open configuration ready to connect to the valve of the gas cylinder.

With reference initially to FIG. 7, the connector 110 is open, i.e. the collets are in their open or disconnect position, ready to connect to the processing port 4 of the valve 2. The handle 90 is up which extends the main body 14 outward from the sleeve 12 allowing the collets 70 to open. Also, the sleeve 12 pulls back the inner sleeve 18 which, via the balls 76, retracts the piston 16 to the left in FIG. 2. Further, because fluid is not flowing through the connector, the lock piston 94 is retracted by the spring 96.

With reference to FIG. 8, the connector 110 is shown connected to the fluid port 4 of the valve. To achieve this, the connector is brought toward the fluid port and inserted onto the port with the end of the piston 16 inserted into the port 4 and the collets 70 surrounding the port. The alignment collar 58 is engaged against the end of the processing port 4 to give the connector 110 stability and alignment to the port 4. The handle 90 is then rotated downward to the position shown around the valve. As the handle 90 is rotated down, the main body is retracted relative to the sleeve 12 which locks the collets 70 onto the external threads on the port 4. The inner sleeve 18 is no longer held back by the sleeve 12 and can therefore float relative to the sleeve 12. This permits the spring 46 to bias the piston 16 to the left against the interior surface in the port to enhance the seal. The lock piston 94 is still retracted by the spring 96 but is in a position to move outward into the channel 132 of the sleeve 12 to lock the sleeve 12 once pressure is applied. The activation shaft 112 is still retracted.

Figure 9:
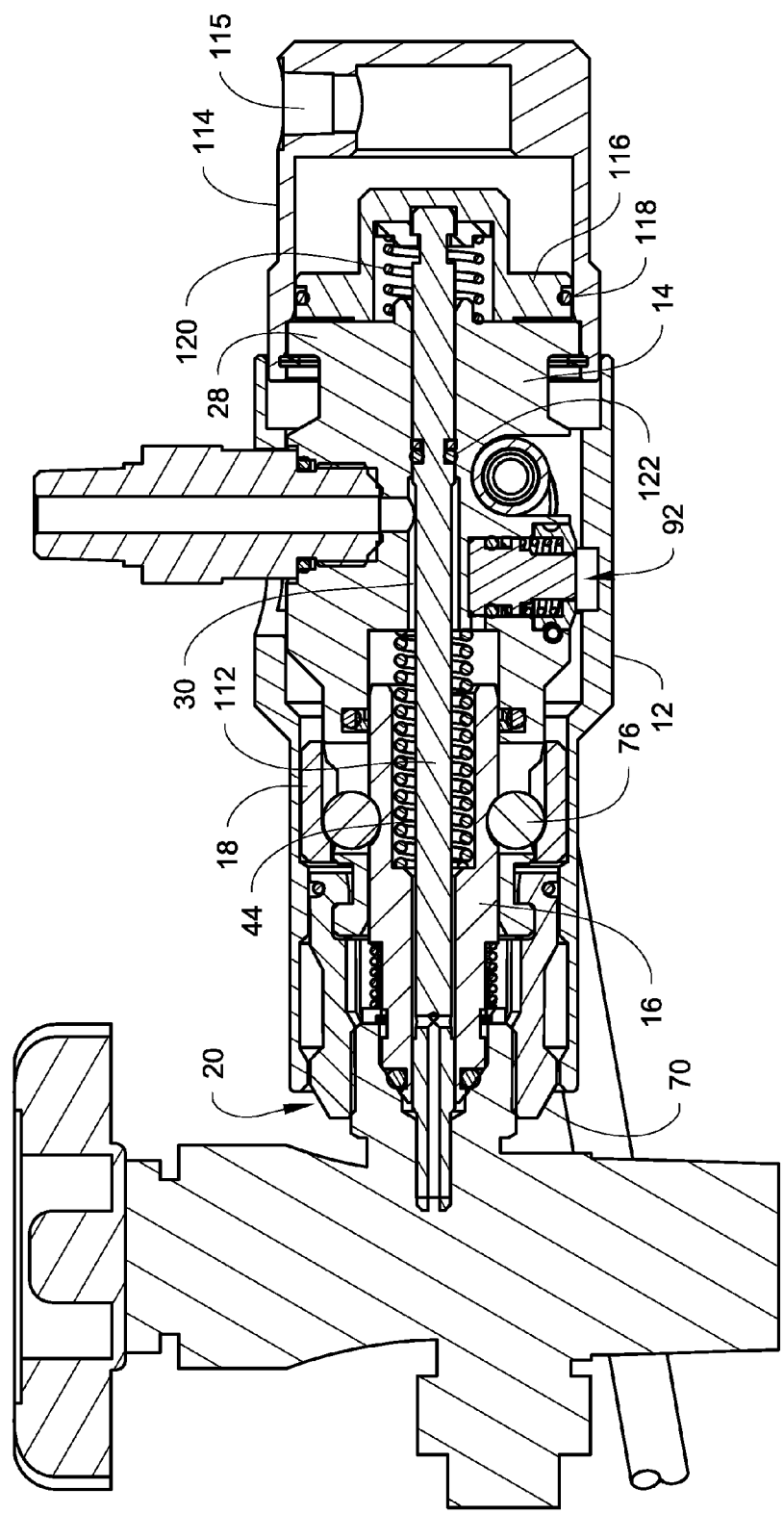
FIG. 9 is a cross-sectional view of the connector of FIG. 6 with a valve activation shaft actuated to open a valve within the cylinder valve.

With reference to FIG. 9, pressurized fluid is introduced through the inlet 115 into the housing 114. In one example, the pressurized fluid is air. However, other type of pressurized fluids could be used. The air acts against the piston member 116, forcing the piston member 116 and the activation shaft 112 forward. The front end of the shaft 112 is pushed into the processing port 4 and opens the valve within the processing port to allow the flow of fluid into the cylinder.

Figure 10:
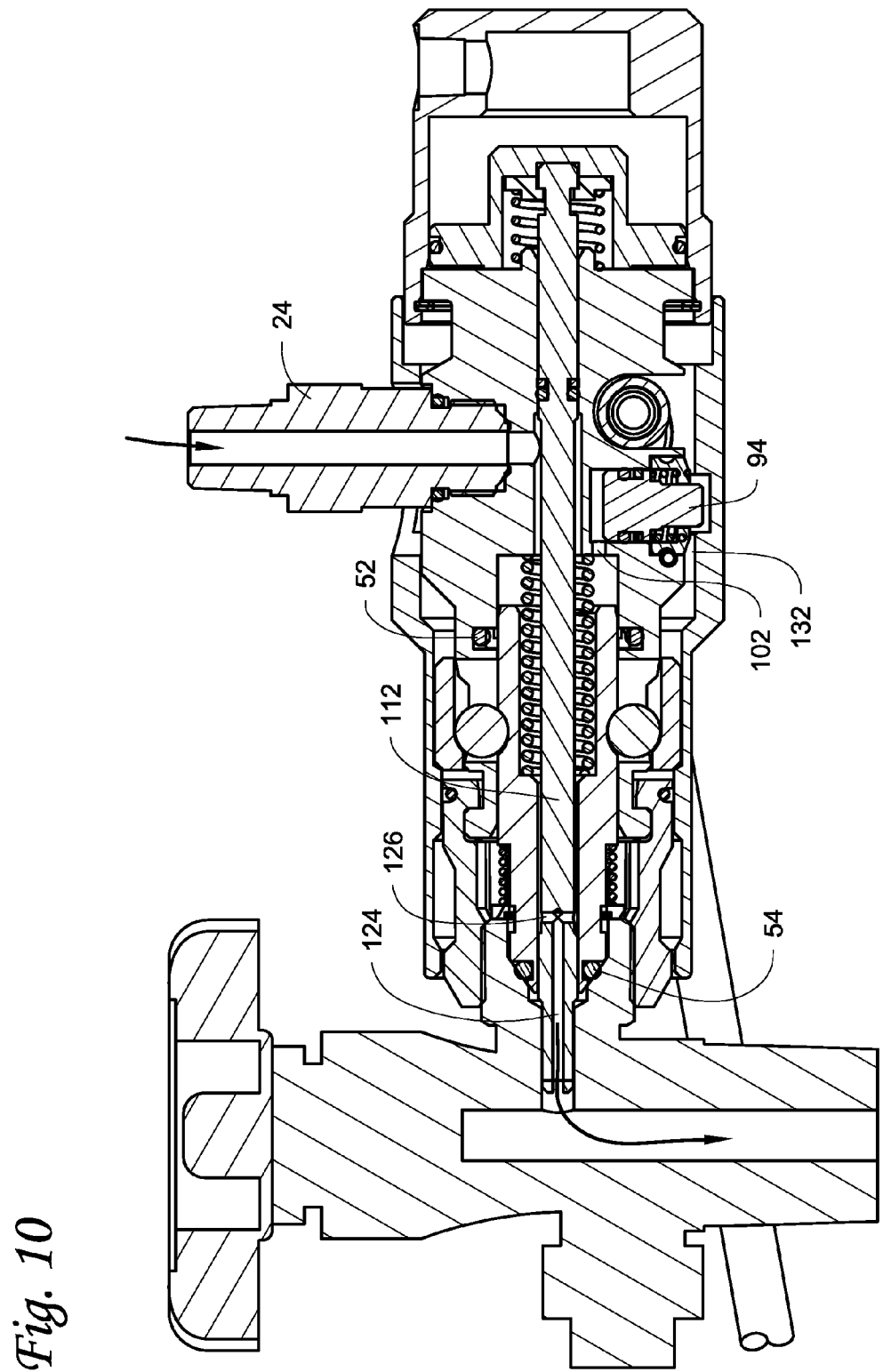
FIG. 10 is a cross-sectional view of the connector of FIG. 6 while the connector is pressurized.
Figure 11:
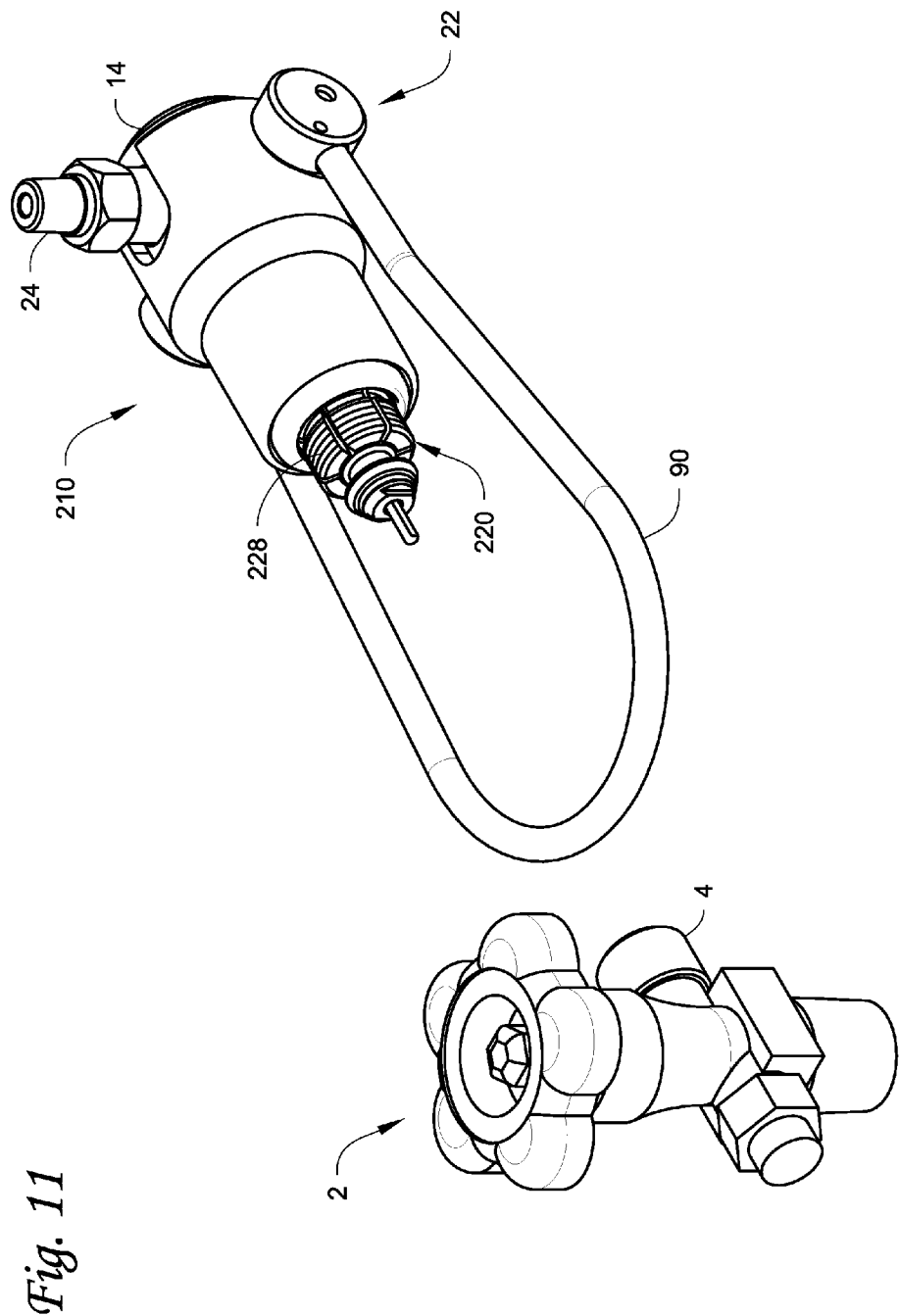
FIG. 11 is a perspective view of a third embodiment of a quick connect fluid connector for connection to a valve of a gas cylinder.

With reference to FIG. 10, the connector 110 is shown while pressurized during a fill process where fluid is introduced through the nipple 24 to fill the cylinder. After the connector has been connected, the user opens the valve 2 manually to allow fluid to flow into the cylinder. As evident from the figures, the sealing diameter of the piston 16 is larger than the sealing diameter against the surface of the processing port 4 to give the piston a positive pressure balance (this is evident from the diameter of the seal 52 which is larger than the diameter of the seal 54). Therefore, the fluid acts against the right end of the piston 16, forcing the piston to the left to increase the seal with the surface of the processing port. Also, a portion of the fluid flows through the passageway 102 and acts against the end of the lock piston 94, forcing the lock piston outward into the channel 132 of the sleeve 12 to prevent the main body 14 from moving forward. This prevents accidental disconnect of the connector while under pressure. In addition, because the handle 90 is around the valve 2, if there is a structural failure of the connector the connector will not fly away from the valve 2.

Disconnection of the connector 110 is the reverse of connection. The flow of fluid through the nipple 24 is stopped and pressure has dissipated allowing the lock piston 94 to retract. Pressure is also released from the housing 114, allowing the spring 120 to bias the activation shaft 112 to its retracted positioned. The handle 90 is then rotated upward to the position shown in FIG. 7, which moves the main body 14 forward relative to the sleeve 12, pulling the piston back and allowing the collets to open.

FIGS. 11-19 illustrate another embodiment of a connector 210 that is similar in many respects to the connectors 10, 110 and the same or similar elements will be referenced using the same reference numerals. In particular, in the connector 210, the cylindrical outer sleeve 12, the main body 14, the piston 16, the inner sleeve 18, and the actuation mechanism 22 are the same or similar to the elements in the connector 10.

The connector 210 includes a connection mechanism 220 that is different than the connection mechanism 20. In particular, the connection mechanism 220 includes a plurality of collets 222 that are mounted at the front end of the main body 14 and surround the first piston end region 40. The collets 222 are mounted to pivot outwardly from an initial collapsed or disconnect position (FIGS. 12-15) to an expanded or connect position (FIGS. 16-19). The collets 222 are retained at the front end of the main body by a retainer 224. A spring 226, for example a garter spring, surrounds the collets and biases the collets toward the collapsed or disconnect position. The collets are actuated outward to their expanded or connect position by forward movement of the piston 16 which is formed with a channel 230 (see FIG. 16) adjacent the front end thereof to receive the collapsed collets and a ramp surface 232 (FIGS. 12 and 16) to actuate the collets outward when the piston moves forward. The exterior surfaces of the collets 222 are formed with threads 228 that grip with corresponding threads formed on an interior surface of the port 4. This construction and operation of the collets 222 and actuation of the collets by the piston 16 is conventional and would be well understood by persons of ordinary skill in the art.

With reference to FIGS. 12-15, a front sleeve 240 surrounds the rear end of the collets 222 and the front end of the main body 14, and the sleeve 240 is partially disposed within the sleeve 12 and extends beyond the front of the sleeve. The function of the front sleeve 240 is similar to the function of the alignment collar 58. The front sleeve 240 is retained in the connector 210 by pins 242 that extend through the sleeve 240, the retainer 224 and into the main body 14 to prevent the front sleeve from falling out. The front sleeve 240 is also biased outward by a spring. A plurality of balls 244 retained in the front end of the main body 14 limit movement of the front sleeve 240.

Figure 12:
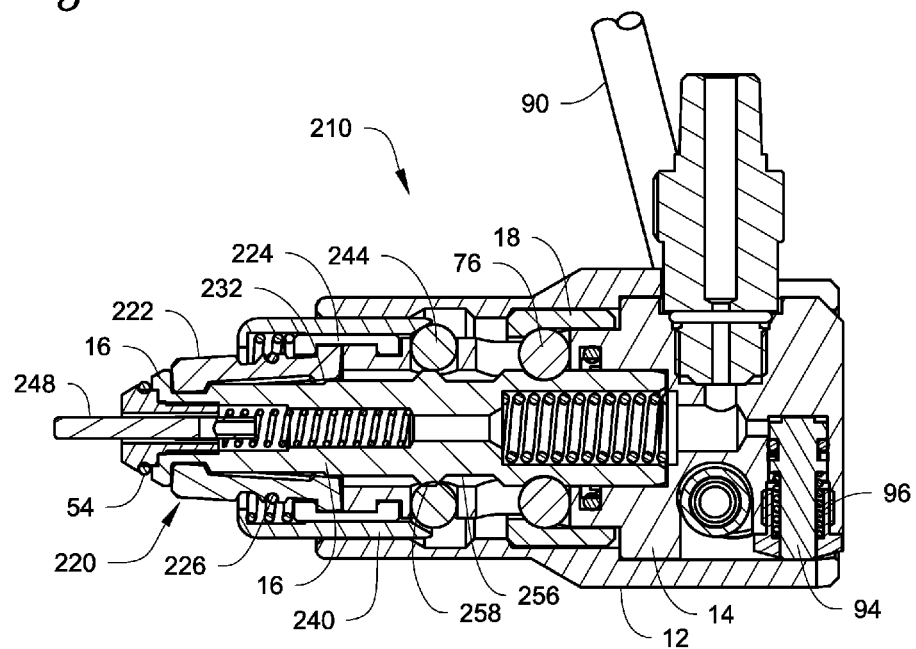
FIG. 12 is a cross-sectional view along an X-Y plane of the connector of FIG. 11 in an open configuration ready to connect to the valve of the gas cylinder.
Figure 13:
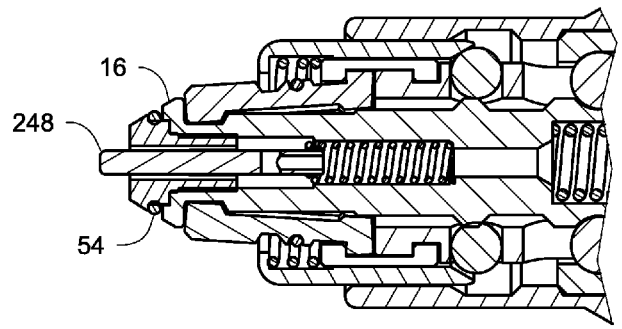
FIG. 13 is a partial cross-sectional, perspective view of the connector of FIG. 12 but with the valve actuation pin retracted compared to FIG. 12.

As shown in FIGS. 12-13, the front end of the piston 16 can be provided with a valve actuation pin 248 for actuating a valve within the processing port 4. The pin 248 can either be placed in an extended position (shown in FIG. 12) for actuating the valve, or pushed in and twisted to lock it in an inner position (shown in FIG. 13) for a standard processing port 4 with no valve present in the port. This type of pin 248 is known in quick connect gas fluid connectors.

Figure 14:
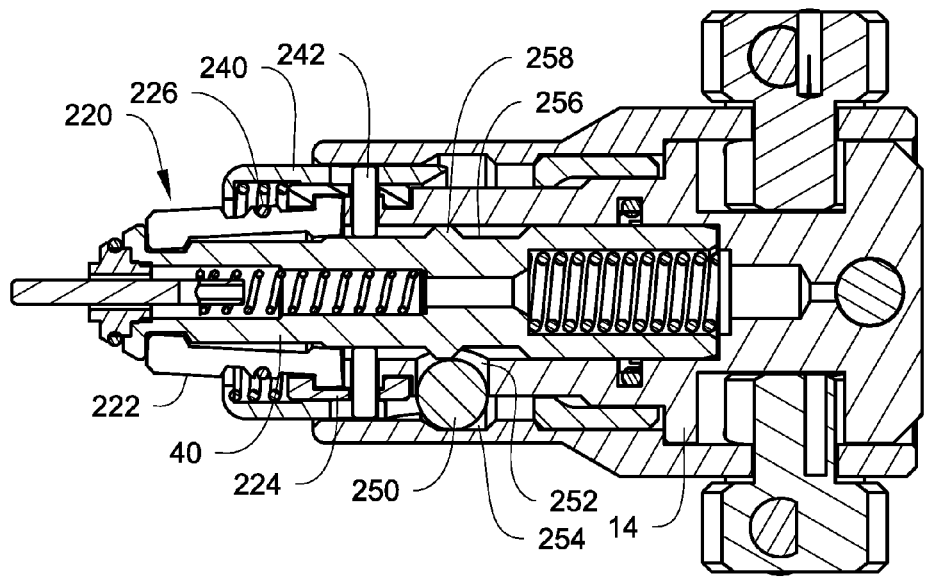
FIG. 14 is a cross-sectional view along an X-Z plane of the connector of FIG. 11 in an open configuration ready to connect to the valve of the gas cylinder.
Figure 15:
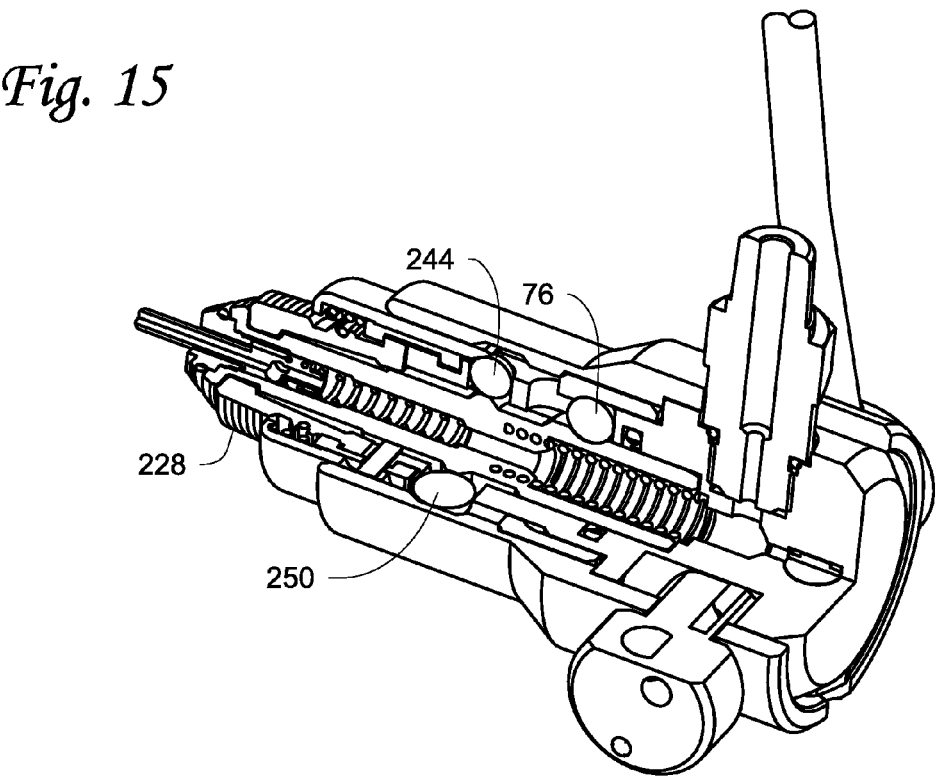
FIG. 15 is a three-quarters view illustrating the various balls used in the connector of FIG. 11.

In the connector 210, the piston 16 is permitted to move enough toward the rear of the connector once connection is made to break the seal with the processing port. However, a mechanism is provided to limit the range of travel of the piston, to permit loss of sealing ability but not enough movement to allow disconnection of the connector. With reference to FIGS. 14 and 15, where FIG. 14 is a cross-sectional view taken along a plane 90 degrees offset from the plane of the cross-section in FIG. 12, the mechanism includes a locking ball 250 that is disposed within an opening 252 formed in the main body 14 and in FIG. 14 is also disposed in a groove 254 formed in the interior surface of the sleeve 12. The piston 16 includes a circumferential groove 256 whose front end is defined by a shoulder 258. In the open or disconnect position shown in FIG. 14, the shoulder 258 is positioned under the ball 250 preventing movement of the ball 250 toward the piston 16.

Operation of the connector 210 will now be described with reference to FIGS. 12-19. The construction and operation of the actuation mechanism 22 in the connector 210 is the same as the actuation mechanism in the connector 10.

With reference initially to FIGS. 12 and 13, the connector 210 is open, i.e. the collets are in their collapsed or disconnect position, ready to connect to the processing port 4 of the valve 2. The handle 90 is up which extends the main body 14 outward from the sleeve 12. Also, the sleeve 12 pulls back the inner sleeve 18 which, via the balls 76, retracts the piston 16 to the left in FIG. 12. Since the piston 16 is retracted, the collets 222 can collapse. The front sleeve 240 is locked by the balls 244 in a forward position to provide a solid face to press against the processing port 4 for alignment. Further, because fluid is not flowing through the connector, the lock piston 94 is retracted by the spring 96. The pin 248 is either extended or retracted depending upon whether or not the processing port 4 includes an internal valve that is to be actuated open by the connector 210.

FIGS. 14 and 15 also depict the connector 210 in the open, ready to connect configuration. The cross-section in FIG. 14 is taken along an X-Z plane 90 degrees offset from the X-Y plane of the cross-section in FIG. 12. As described above, the ball 250 restricts movement of the piston 16 once connected. However, when the connector is open as shown in FIG. 14, the ball 250 does not restrict movement of the piston 16.

Figure 16:
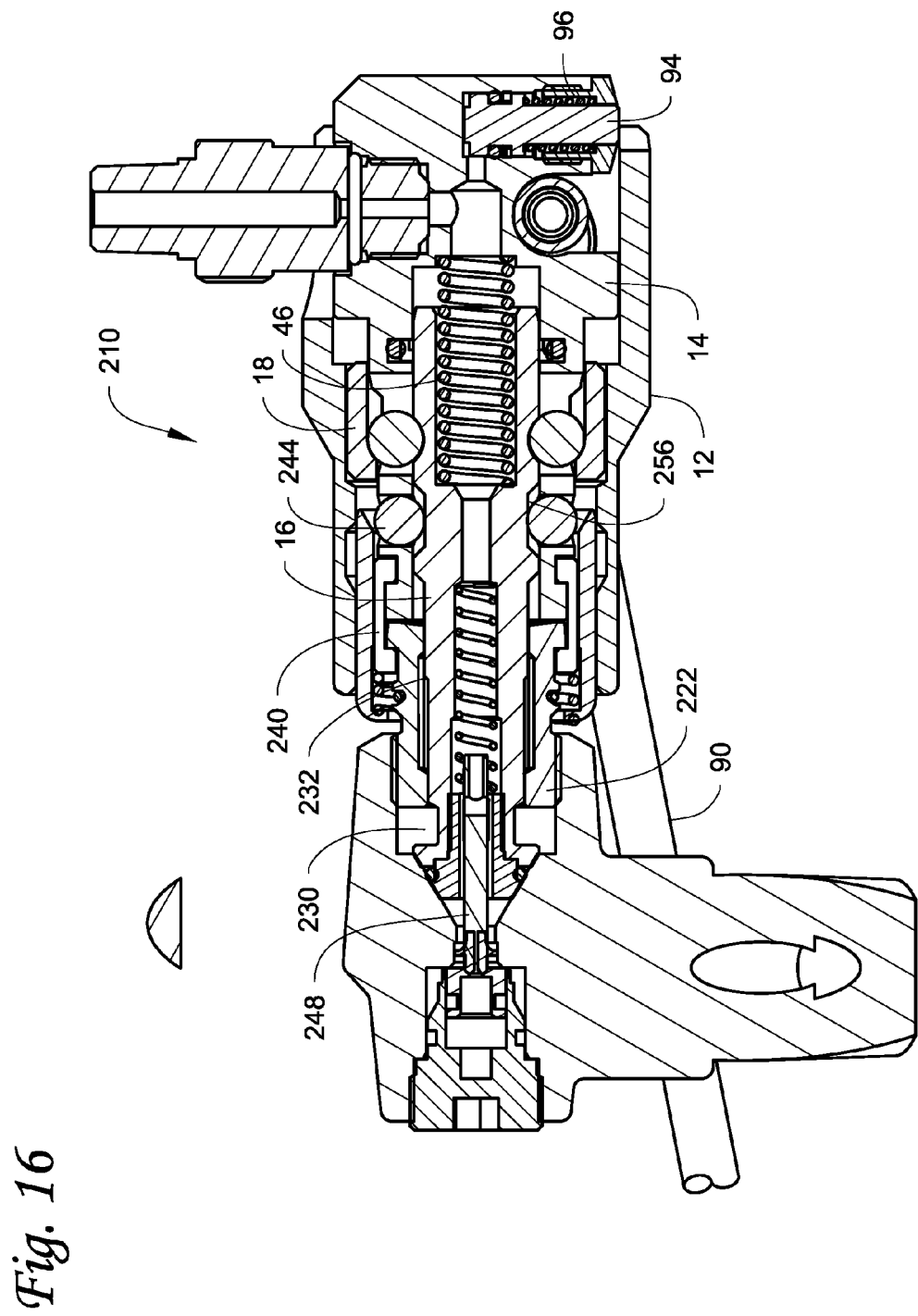
FIG. 16 is a cross-sectional view of the connector of FIG. 11 connected to the valve.
Figure 17:
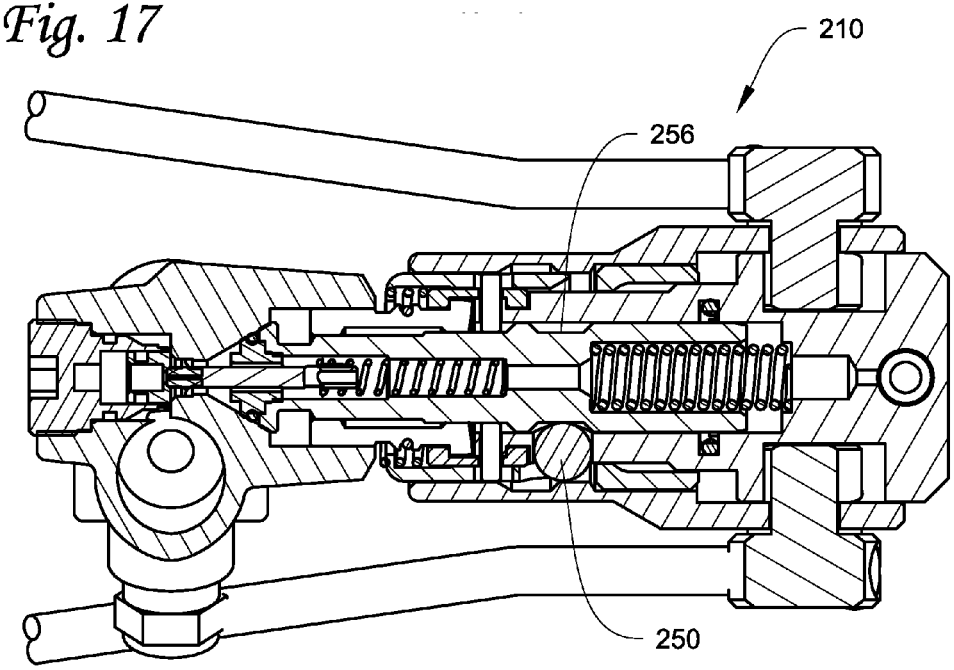
FIG. 17 is a cross-sectional view taken along the X-Z plane of the connector connected to the valve.
Figure 18:
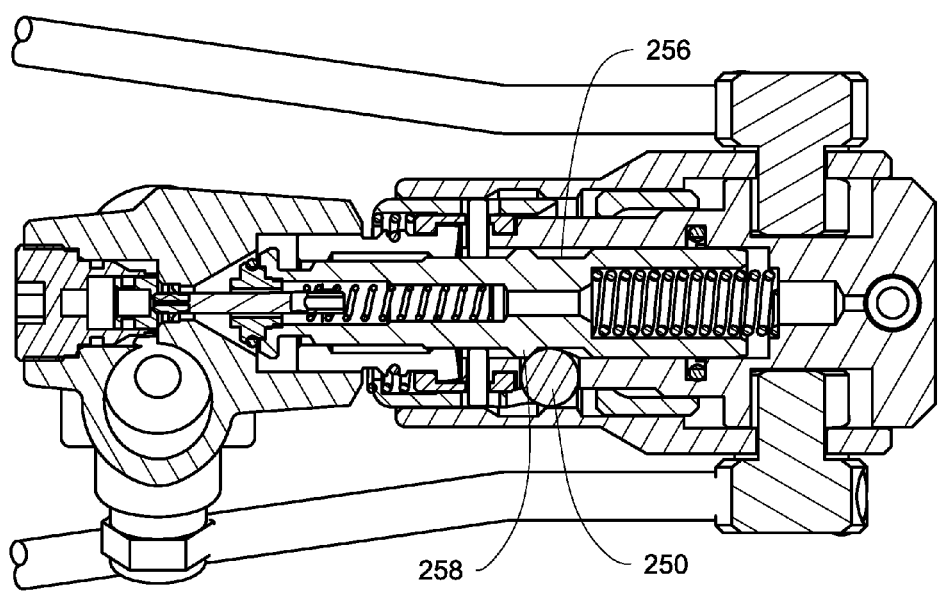
FIG. 18 is a cross-sectional view similar to FIG. 17 but with a pressure surge pushing the piston in a reverse direction to the right.

With reference to FIGS. 16-18, the connector 210 is shown connected to the processing port 4 of the valve. To achieve this, the connector is brought toward the processing port and the end of the piston 16 and the front ends of the collets 222 inserted into the port 4. The handle 90 is then rotated downward to the position shown around the valve. As the handle 90 is rotated down, the main body 14 is retracted relative to the sleeve 12. The inner sleeve 18 is no longer held back by the sleeve 12 and can therefore float relative to the sleeve 12. This permits the spring 46 to bias the piston 16 to the left against the interior surface in the port to enhance the seal. As the main body 14 pulls the collets 222 to the right in FIGS. 16-18, the collets ride up on the ramp surface 232 and are expanded outwardly into engagement with the threads on the interior surface of the processing port.

At the same time, the front sleeve 240 is allowed to move back since the balls 244 that hold it forward drop into the groove 256 in the piston 16. This permits the collets 222 to more readily engage the internal threads on the processing port. The lock piston 94 is still retracted by the spring 96 but is in a position to move outward and lock the sleeve 12 once pressure is applied. The pin 248 is shown as being extended to open the internal valve in the processing port, but the pin 248 could be retracted for processing ports without a valve.

FIG. 17 also depicts the connector 210 connected to the processing port 4 but taken along an X-Z plane 90 degrees offset from the X-Y plane of the cross-section in FIG. 16. The ball 250 that restricts movement of the piston 16 once connected has dropped into the groove 256 in the piston 16. The groove 256 is wide enough to allow the piston 16 to float and adjust for tolerances. However, as illustrated in FIG. 18, if there is a pressure surge that pushes the piston back into the main body 14, the ball 250 limits the travel of the piston 16 by abutting against the shoulder 258 on the piston. The size of the ball 250 and the groove 256 are selected to allow the piston to push back into the main body a sufficient distance to allow a loss of sealing ability between the piston and the processing port (FIG. 18), but not a sufficient distance that would allow the collets to collapse to allow disconnection of the connector so that the collets remain locked during a pressure surge.

Figure 19:
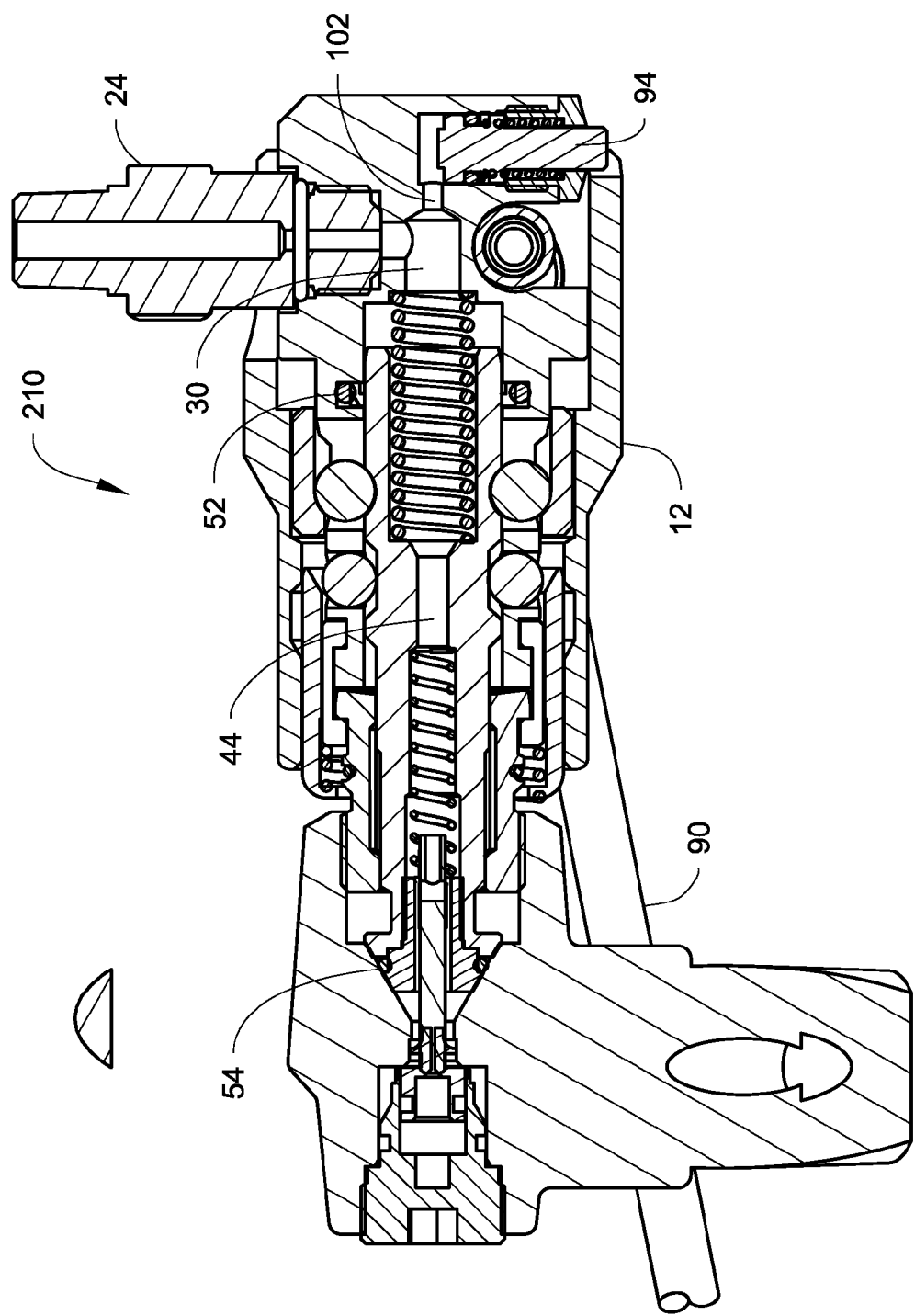
FIG. 19 is a cross-sectional view of the connector of FIG. 11 while the connector is pressurized.

With reference to FIG. 19, the connector 210 is shown while pressurized during a fill process where fluid is introduced through the nipple 24, flows through the fluid passageways 30, 44, into the valve 2 and into the cylinder to fill the cylinder. As evident from the figures, the sealing diameter of the piston 16 is larger than the sealing diameter against the processing port 4 to give the piston a positive pressure balance (this is evident from the diameter of the seal 52 which is larger than the diameter of the seal 54). Therefore, the fluid acts against the right end of the piston 16, forcing the piston to the left to increase the seal with the processing port. Also, a portion of the fluid flows through the passageway 102 and acts against the end of the lock piston 94, forcing the lock piston outward behind the sleeve 12 to prevent the body from moving forward. This prevents accidental disconnect of the connector while under pressure. In addition, because the handle 90 is around the valve 2, if there is a structural failure of the connector the connector will not fly away from the valve 2.

Disconnection of the connector is the reverse of connection. The flow of fluid through the nipple 24 is stopped and the valve 2 is closed. Once the flow is stopped and pressure has dissipated, the lock piston 94 retracts. The handle 90 is then rotated upward to the position shown in FIG. 12, which moves the main body 14 forward relative to the sleeve 12, pulling the piston back and allowing the collets to collapse for disconnection.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A quick-connect connector for transferring a fluid, comprising:
    a cylindrical sleeve defining a longitudinal axis;
    a main body disposed at least partially in the sleeve, the main body and the sleeve are slideable relative to one another parallel to the longitudinal axis, the main body includes a first main body end region, a second main body end region, and a fluid port connected thereto that projects beyond an exterior of the cylindrical sleeve, the main body defines a fluid passageway that is in fluid communication with the fluid port, and the main body includes an actuation slot defined therein;
    a piston disposed at least partially within the main body, the piston and the main body are slideable relative to one another parallel to the longitudinal axis, and the piston includes a first piston end region that projects axially beyond the first main body end region of the main body, a second piston end region disposed within the main body, and a fluid passageway that extends from the first piston end region and is in fluid communication with the fluid passageway of the main body;
    a connection mechanism mounted to the first main body end region for connection to a fluid processing port, the connection mechanism includes a plurality of collets that surround the first piston end region, the collets being actuatable between a connect position for connection with the fluid processing port and a disconnect position; and
    an actuation mechanism for actuating the collets from the disconnect position to the connect position, the actuation mechanism includes a pair of cylinders rotatably supported by the sleeve for rotation about a first axis, and an eccentric mounted roller mechanism interconnecting the cylinders, the eccentric mounted roller mechanism being disposed within the actuation slot of the main body and extends along a second axis that is offset from the first axis.

2. The quick-connect connector of claim 1, wherein the eccentric mounted roller mechanism comprises a shaft that interconnects the cylinders, and a sleeve rotatably disposed about the shaft.

3. The quick-connect connector of claim 1, wherein the actuation slot includes first and second facing side walls, and the eccentric mounted roller mechanism is in substantially continuous engagement with the first and second facing side walls.

4. The quick-connect connector of claim 1, further comprising an inner sleeve disposed within the cylindrical sleeve and surrounding the main body, and the inner sleeve is moveable independently of the cylindrical sleeve.

5. The quick-connect connector of claim 1, wherein the piston is slideable relative to the main body in a direction parallel to the longitudinal axis between a first sealing position, a second non-sealing position and a home position;
    the first piston end region includes a seal disposed thereon configured for sealing engagement with the fluid processing port at the first sealing position;
    a groove formed in an outer circumference of the piston between the first piston end region and the second piston end region, the piston including a shoulder defining one end of the groove;
    a groove formed on an interior surface of the cylindrical sleeve;
    an opening formed through the main body;
    a locking ball disposed in the opening in the main body, the locking ball is disposable in the groove on the interior surface of the cylindrical sleeve and the shoulder of the piston is disposed opposite the groove on the interior surface of the cylindrical sleeve when the piston is at the home position; when the piston is at the first sealing position, the ball is disposable in the groove in the outer circumference of the piston and the groove on the interior surface of the cylindrical sleeve is offset in an axial direction from the groove in the outer circumference of the piston to prevent the ball from being disposable in the groove on the interior surface of the cylindrical sleeve; and the groove in the outer circumference of the piston has an axial width that is greater than a diameter of the locking ball, and the axial width is sufficient to permit the piston to move axially from the first sealing position to the second non-sealing position while the collets remain in the connect position.

6. A quick-connect connector that is connectable to a processing port of a gas cylinder, comprising:

a cylindrical sleeve defining a longitudinal axis;

a main body disposed at least partially in the sleeve, the main body and the sleeve are slideable relative to one another parallel to the longitudinal axis, the main body includes a fluid port connected thereto that projects beyond an exterior of the cylindrical sleeve, the main body defines a fluid passageway that is in fluid communication with the fluid port, and the main body includes an actuation slot defined therein, the actuation slot includes first and second facing side walls;

a piston disposed at least partially within the main body, the piston and the main body are slideable relative to one another parallel to the longitudinal axis, and the piston includes a fluid passageway that is in fluid communication with the fluid passageway of the main body, the fluid passageway of the piston includes an end configured for fluid communication with the processing port of the gas cylinder;

a connection mechanism mounted to the main body that is connectable to the processing port of the gas cylinder, the connection mechanism includes a plurality of collets that are actuatable between a connect position for connection with the processing port and a disconnect position; and an actuation mechanism connected to the collets to actuate the collets between the disconnect position and the connect position, the actuation mechanism includes an eccentric mounted roller mechanism and a handle connected to the eccentric mounted roller mechanism for rotating the eccentric mounted roller mechanism about a rotation axis that is offset from a rotation axis of the handle, and the eccentric mounted roller mechanism is disposed within the actuation slot of the main body and is in continuous engagement with the first and second facing side walls.

7. The quick-connect connector of claim 6, wherein the eccentric mounted roller mechanism comprises a shaft connected to the handle, and a sleeve rotatably disposed about the shaft.

8. The quick-connect connector of claim 6, further comprising an inner sleeve disposed within the cylindrical sleeve and surrounding the main body, and the inner sleeve is moveable independently of the cylindrical sleeve.

9. The quick-connect connector of claim 1, wherein the piston includes a seal disposed thereon that is configured for sealing engagement with the processing port of the gas cylinder, and the piston is slideable relative to the main body in a direction parallel to the longitudinal axis between a first position in sealing engagement with the processing port of the gas cylinder and a non-sealing position;

at the non-sealing position of the piston, the collets are in their connect position connected with the processing port of the gas cylinder; and means for limiting travel of the piston from the first position to the non-sealing position when gas is flowing through the processing port so that the piston cannot travel beyond the non-sealing position so that the collets remain in their connect position.

10. A quick-connect connector for transferring a fluid, comprising:

a cylindrical sleeve defining a longitudinal axis;

a main body disposed at least partially in the sleeve, the main body and the sleeve are slideable relative to one another parallel to the longitudinal axis, the main body includes a first main body end region, a second main body end region, and a fluid port connected thereto that projects beyond an exterior of the cylindrical sleeve, and the main body defines a fluid passageway that is in fluid communication with the fluid port;

an inner sleeve disposed within the cylindrical sleeve and surrounding the main body, and the inner sleeve is moveable independently of the cylindrical sleeve;

a piston disposed at least partially within the main body, the piston and the main body are slideable relative to one another parallel to the longitudinal axis, and the piston includes a first piston end region that projects axially beyond the first main body end region of the main body, a second piston end region disposed within the main body, and a fluid passageway that extends from the first piston end region and is in fluid communication with the fluid passageway of the main body;

a connection mechanism mounted to the first main body end region for connection to a fluid processing port, the connection mechanism includes a plurality of collets that surround the first piston end region, the collets being actuatable between a connect position for connection with the fluid processing port and a disconnect position; and an actuation mechanism for actuating the collets from the disconnect position to the connect position.

11. A quick-connect connector for transferring a fluid, comprising:

a cylindrical sleeve defining a longitudinal axis;

a main body disposed at least partially in the sleeve, the main body and the sleeve are slideable relative to one another parallel to the longitudinal axis, the main body includes a first main body end region, a second main body end region, and a fluid port connected thereto that projects beyond an exterior of the cylindrical sleeve, the main body defines a fluid passageway that is in fluid communication with the fluid port, and the main body includes an actuation slot defined therein;

a piston disposed at least partially within the main body and slideable relative to the main body in a direction parallel to the longitudinal axis between a first sealing position, a second non-sealing position and a home position; the piston includes a first piston end region that projects axially beyond the first main body end region of the main body, a second piston end region disposed within the main body, and a fluid passageway that extends from the first piston end region and is in fluid communication with the fluid passageway of the main body;

the first piston end region includes a seal disposed thereon configured for sealing engagement with a fluid processing port at the first sealing position;

a groove formed in an outer circumference of the piston between the first piston end region and the second piston end region, the piston including a shoulder defining one end of the groove;

a groove formed on an interior surface of the cylindrical sleeve;

an opening formed through the main body;

a locking ball disposed in the opening in the main body, the locking ball is disposable in the groove on the interior surface of the cylindrical sleeve and the shoulder of the piston is disposed opposite the groove on the interior surface of the cylindrical sleeve when the piston is at the home position; when the piston is at the first sealing position, the ball is disposable in the groove in the outer circumference of the piston and the groove on the interior surface of the cylindrical sleeve is offset in an axial direction from the groove in the outer circumference of the piston to prevent the ball from being disposable in the groove on the interior surface of the cylindrical sleeve;

a connection mechanism mounted to the first main body end region for connection to a fluid processing port, the connection mechanism includes a plurality of collets that surround the first piston end region, the collets being actuatable between a connect position for connection with the fluid processing port and a disconnect position;

an actuation mechanism for actuating the collets from the disconnect position to the connect position; and the groove in the outer circumference of the piston has an axial width that is greater than a diameter of the locking ball, and the axial width is sufficient to permit the piston to move axially from the first sealing position to the second non-sealing position while the collets remain in the connect position.

12. A quick-connect connector for transferring a fluid, comprising:

a cylindrical sleeve defining a longitudinal axis;

a main body disposed at least partially in the sleeve, the main body and the sleeve are slideable relative to one another parallel to the longitudinal axis, the main body includes a first main body end region, a second main body end region, and a fluid port connected thereto that projects beyond an exterior of the cylindrical sleeve, the main body defines a fluid passageway that is in fluid communication with the fluid port, and the main body includes an actuation slot defined therein;

an inner sleeve disposed within the cylindrical sleeve and surrounding the main body, and the inner sleeve is moveable independently of the cylindrical sleeve;

a piston disposed at least partially within the main body and slideable relative to the main body in a direction parallel to the longitudinal axis between a first sealing position, a second non-sealing position and a home position; the piston includes a first piston end region that projects axially beyond the first main body end region of the main body, a second piston end region disposed within the main body, and a fluid passageway that extends from the first piston end region and is in fluid communication with the fluid passageway of the main body;

the first piston end region includes a seal disposed thereon configured for sealing engagement with a fluid processing port at the first sealing position;

a groove formed in an outer circumference of the piston between the first piston end region and the second piston end region, the piston including a shoulder defining one end of the groove;

a groove formed on an interior surface of the cylindrical sleeve;

an opening formed through the main body;

a locking ball disposed in the opening in the main body, the locking ball is disposable in the groove on the interior surface of the cylindrical sleeve and the shoulder of the piston is disposed opposite the groove on the interior surface of the cylindrical sleeve when the piston is at the home position; when the piston is at the first sealing position, the ball is disposable in the groove in the outer circumference of the piston and the groove on the interior surface of the cylindrical sleeve is offset in an axial direction from the groove in the outer circumference of the piston to prevent the ball from being disposable in the groove on the interior surface of the cylindrical sleeve;

a connection mechanism mounted to the first main body end region for connection to a fluid processing port, the connection mechanism includes a plurality of collets that surround the first piston end region, the collets being actuatable between a connect position for connection with the fluid processing port and a disconnect position;

an actuation mechanism for actuating the collets from the disconnect position to the connect position, the actuation mechanism includes a pair of cylinders rotatably supported by the sleeve for rotation about a first axis, and an eccentric mounted roller mechanism interconnecting the cylinders, the eccentric mounted roller mechanism being disposed within the actuation slot of the main body and extends along a second axis that is offset from the first axis; and the groove in the outer circumference of the piston has an axial width that is greater than a diameter of the locking ball, and the axial width is sufficient to permit the piston to move axially from the first sealing position to the second non-sealing position while the collets remain in the connect position.

\* \* \* \* \*